S. GOMEZ & E. SAEZ.
DECORTICATING MACHINE.
APPLICATION FILED JUNE 2, 1909.
992,418.
Patented May 16, 1911.
2 SHEETS—SHEET 1.
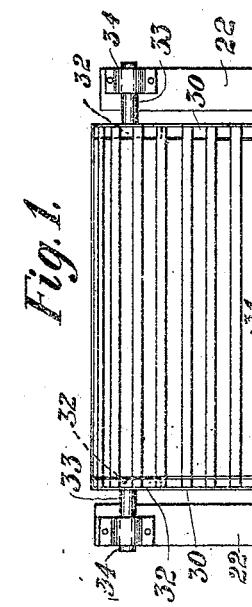
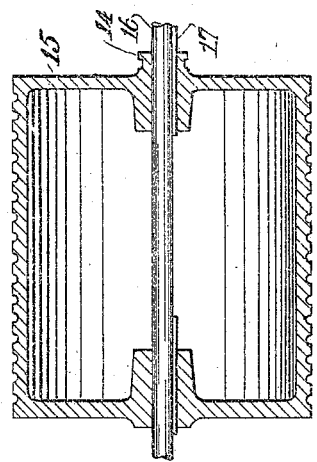
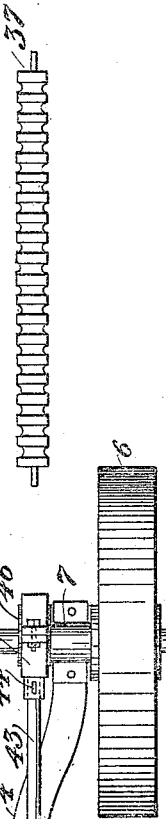
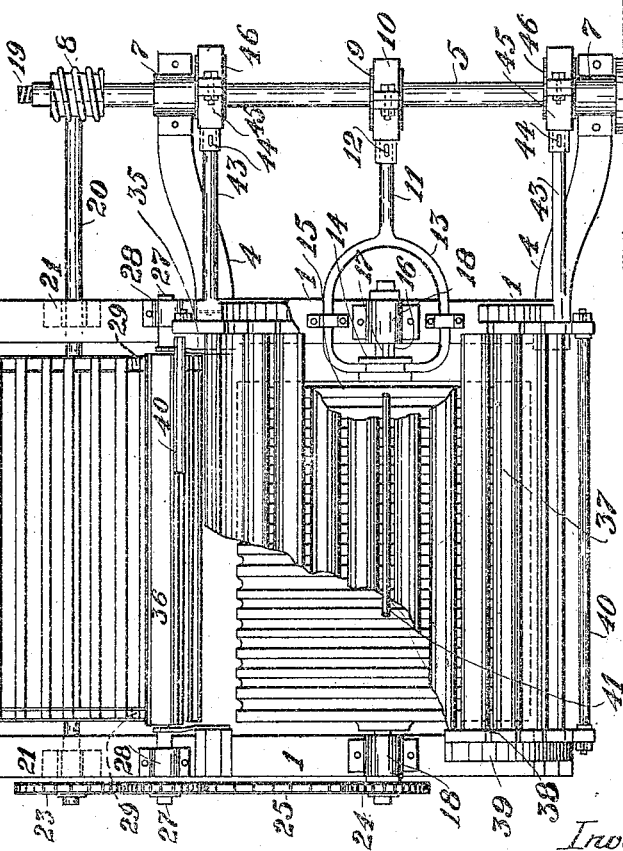
Witnesses:
Geo. Darr
Myron H. Lear
Inventors
Sixto Gomez, &
Emilio Saez
By Milo B. Stevens & Co.
Attorneys

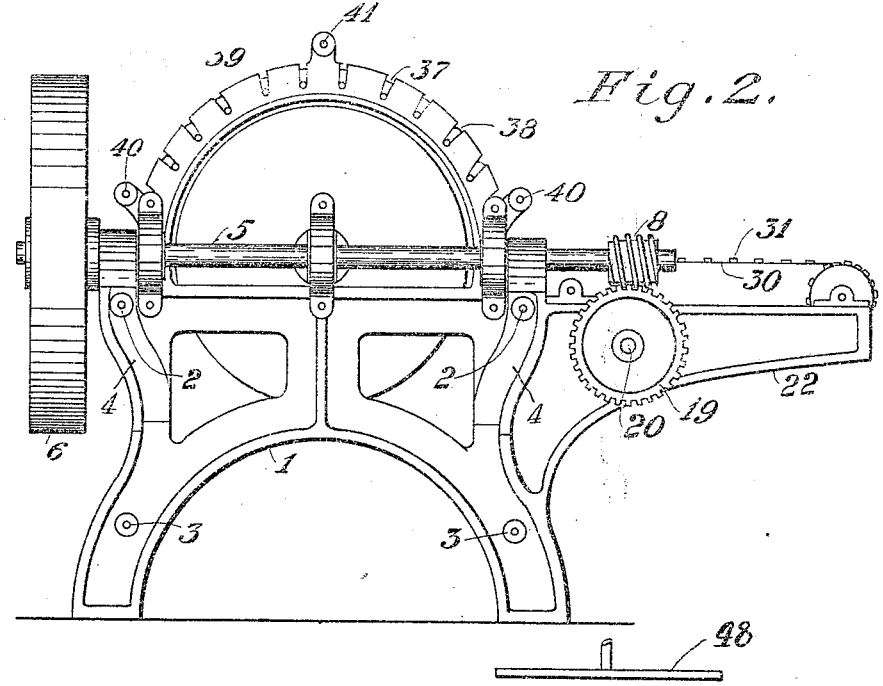
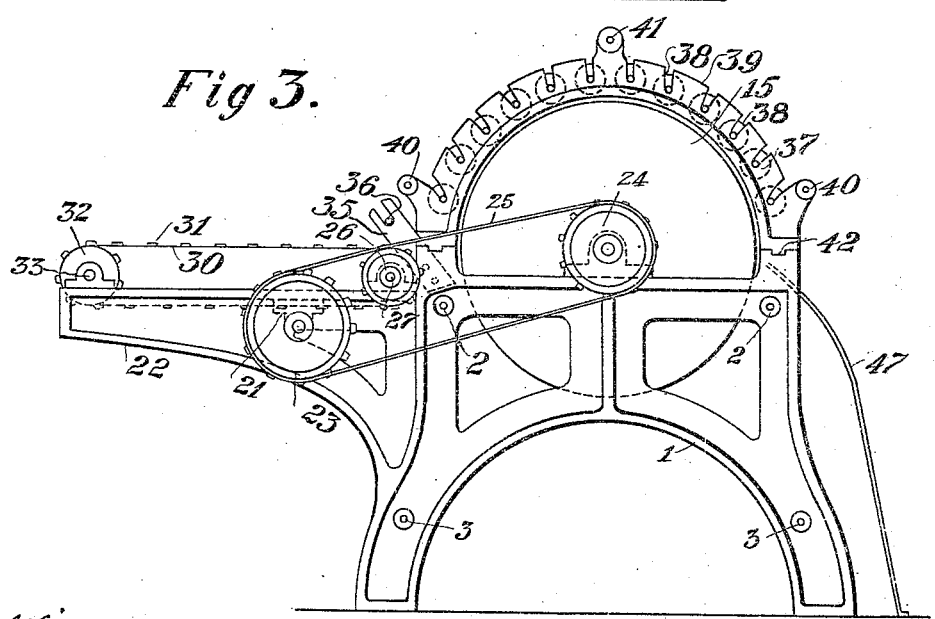

UNITED STATES PATENT OFFICE.

SIXTO GOMEZ AND EMILIO SAEZ, OF CONTRERAS, MEXICO.

DECORTICATING-MACHINE.

992,418.  Specification of Letters Patent.  Patented May 16, 1911.

Application filed June 2, 1909. Serial No. 499,723.

*To all whom it may concern:*

Be it known that we, SIXTO GOMEZ and EMILIO SAEZ, subjects of the King of Spain, residing at Contreras, D. F., Mexico, have invented certain new and useful Improvements in Decorticating-Machines, of which the following is a specification.

This invention relates to decorticating machines, and has for its object to provide a novel construction and combination of parts, producing a new operation, and heightening its efficiency for the purpose of peeling or threshing and cleaning the membrane or thin skin which covers the roots and stalks, and the bark on the branches of trees.

While our invention may, without modification as to its vital points, be applied to use in the threshing of several characters of plants, trees, roots, and vegetable grains, it is, as herein shown and described, especially applicable to use in separating the thin skin which surrounds the Mexican grass (*Zacaton*) as a step in the brush making industry, and in removing the bark of the branches of the Mexican gum containing tree (*Guayule*).

In the accompanying drawings, forming a part of this specification, Figure 1 is a plan view of our improved machine, partly broken away to show a portion of its interior. Figs. 2 and 3 are elevations of opposite sides thereof. Fig. 4 is a view showing sectional diagrams of several modified forms of corrugations. Fig. 5 is a detail longitudinal section through the cylinder, removed. and, Fig. 6 is a plan view of one of the rollers, removed.

Referring to these figures, the framework of our improved machine embodies two longitudinally extending side standards 1, which are braced and connected in spaced relation, by upper cross-bars 2, and lower cross-bars 3. Projecting outwardly from one of the standards 1, is a pair of parallel supporting arms 4, provided with transversely apertured extremities 7 forming bearings for a shaft 5, to which rotatory motion is transmitted, from any suitable source (not shown) through its pulley 6.

Upon the shaft 5 is secured an eccentric sheave 9 around which extends the box-end 10, of a forked connecting rod 11, said rod and its box-end being in separable parts and connected at 12, by a taper pin or the like. The opposite end of rod 11 is in the form of a yoke 13, the extremities of which engage a grooved hub 14, attached to, or forming part of the cylinder 15, and, with said cylinder, splined upon a shaft 16, by keys 17, which shaft is journaled transversely of the standards 1, in bearings 18. The cylinder 15 is thus adapted for rotatory movement with, and sliding movement upon, its shaft 16, by means of the connections stated. A worm-gear 8 secured upon the opposite end of the driven shaft 5, to its pulley 6, imparts movement to a worm wheel 19 upon a shaft 20, journaled transversely through the standards 1. in bearings 21, fixed in supporting arms 22, extending longitudinally from the same ends of the side standards 1, and which may form a part thereof. To the opposite end of shaft 20 is secured a sprocket wheel 23, which is connected, by a sprocket chain 25, to a sprocket wheel 24 upon the adjacent end of shaft 16, whereby to rotate the cylinder 15. At the same time. sprocket chain 25 passes over and actuates a sprocket wheel 26 secured upon the adjacent end of a shaft 27 journaled across the supporting arms 22, in bearings 28, between shafts 20 and 16. This latter shaft 27 also has a pair of sprocket wheels 29, one adjacent each of the supporting arms 22, over which are trained sprocket chains 30, extending also about sprocket wheels 32 of a shaft 33, journaled transversely between the extremities of supporting arms 22, in bearings 34. The chains 30 are connected at intervals by slats 31, and thus form an endless conveying belt for feeding material to the cylinder 15.

Upon each of the side standards 1, adjacent the periphery of cylinder 15, is bolted a forked or bifurcated bracket 35, and these brackets support between them, the shaft of a roller 36, thus arranged above the feed belt and in the path of the material being fed thereby, whereby to prevent the undue crowding of material against the cylinder. This roller is loosely supported within the bifurcated extremities of the brackets 35, and is vertically movable therein to vary the distance between itself and the belt.

About the upper portion of the cylinder 15 are disposed a series of spaced corrugated rollers 37, arranged in an arc adjacent the periphery of said cylinder, and concentric therewith. said rollers being independently revoluble with their shafts in grooves or cut-out portions 38 of semi-circular supporting frames 39, one at each end of the cylinder and above each standard 1, and connected by transverse rods 40 and 41. Thus these frames may slide as a whole, carrying the rollers 37, with respect to the cylinder 15, upon rails 42 transversely upon and between standards 1 forwardly and rearwardly of said cylinder, and are actuated to move longitudinally, in a contrary direction to the similar movement of cylinder 15, as heretofore explained, by rods 43 extending thereto from box-pieces 45, the said box-pieces being disposed upon eccentric sheaves 46 secured upon the main, driven shaft 5.

It will thus be evident that material placed upon the feed belt, will be conducted beneath the feed-regulating roller 36 and upon and against cylinder 15, upon the surface of which it is carried around inside of the series of corrugated rollers 37, which are set in rotative motion thereby. In this manner the material is relieved of its skin or bark, both by the rotative action and the relative longitudinal movement of the cylinder and rollers, and is discharged from the opposite side of the cylinder upon plate 47, the skin or bark which adheres to the cylinder or rollers being washed down through the machine by the suspended water distributer 48 of a suitable liquid supply.

In Fig. 4, we have shown several forms of corrugations, both of the cylinder 15 and rollers 37, and it will be understood the especial shape of these corrugations will depend upon the class of material being operated upon.

We claim:

1. In a machine of the character described, the combination of a rotatable and longitudinally movable corrugated cylinder, rotatable corrugated rollers disposed, in a longitudinally movable series, about, and movable toward and away from the periphery of, said cylinder, means for rotating said cylinder, and means to simultaneously move said rollers and said cylinder longitudinally.

2. In a machine of the character described, the combination of a supporting frame, a corrugated cylinder, rotatably and longitudinally movably mounted therein, a frame disposed over said cylinder and slideable upon said main frame longitudinally of said cylinder, rotatable corrugated rollers idly mounted in said last named frame, in an arc about the periphery of the cylinder concentric therewith, said rollers being movable in their said frame to and from said cylinder, and means for rotating said cylinder and moving the same and said roller carrying frame longitudinally in constantly contrary directions.

In testimony whereof we have affixed our signatures in presence of two witnesses.

SIXTO GOMEZ.
EMILIO SAEZ.

Witnesses:
  GRAUFUS,
  K. GRANDJEAN.